United States Patent [19]
Adachi

[11] Patent Number: 5,388,004
[45] Date of Patent: Feb. 7, 1995

[54] WIDE ANGLE HIGH MAGNIFICATION ZOOM LENS HAVING FIXED GROUP WITH POSITIVE REFRACTIVE POWER

[75] Inventor: Nobuyuki Adachi, Tokyo, Japan

[73] Assignee: Konica Corporation, Tokyo, Japan

[21] Appl. No.: 10,324

[22] Filed: Jan. 28, 1993

[30] Foreign Application Priority Data

Feb. 4, 1992 [JP] Japan ................................. 4-047603

[51] Int. Cl.$^6$ ............................................. G02B 15/14
[52] U.S. Cl. ..................................... 359/683; 359/684
[58] Field of Search ....................... 359/677, 683, 684

[56] References Cited

U.S. PATENT DOCUMENTS

| | | | |
|---|---|---|---|
| 4,269,484 | 5/1981 | Laurent | 359/683 |
| 4,749,266 | 6/1988 | Takahashi et al. | 359/683 |
| 4,830,477 | 5/1989 | Takahashi et al. | 359/683 |
| 4,854,685 | 8/1989 | Corbasson | 359/683 |
| 5,202,992 | 4/1993 | Banno et al. | 359/684 |

FOREIGN PATENT DOCUMENTS

| | | |
|---|---|---|
| 57-2014 | 1/1982 | Japan. |
| 57-12125 | 3/1982 | Japan. |
| 60-39613 | 3/1985 | Japan. |
| 3-158813 | 7/1991 | Japan. |

OTHER PUBLICATIONS

English–language Abstract, Japanese Patent Application Open to Public Inspection No. 3-158813 (Jul. 8, 1991).
English–language Abstract, Japanese Patent Application Open to Public Inspectin No. 57-2014 (Jan. 7, 1982).
English–language Abstract, Japanese Patent Application Open to Public Inspection No. 60-39613 (Mar. 1, 1985).

*Primary Examiner*—John T. Kwon
*Assistant Examiner*—Christopher Verdier
*Attorney, Agent, or Firm*—Finnegan, Henderson, Farabow, Garrett & Dunner

[57] ABSTRACT

A compact, wide angle, high magnification zoom lens in which the following lens groups are successively disposed in order from the object side: a first lens group with positive refractive power in a fixed position, a second lens group with negative refractive power; a third lens group with positive refractive power; a fourth lens group with negative refractive power; and a fifth lens group that is moved along the optical axis in order to compensate for a discrepancy of the image focal point caused by a change of magnification, wherein the second through fifth lens groups are movable along the optical axis of the zoom lens during a change in magnification.

9 Claims, 8 Drawing Sheets

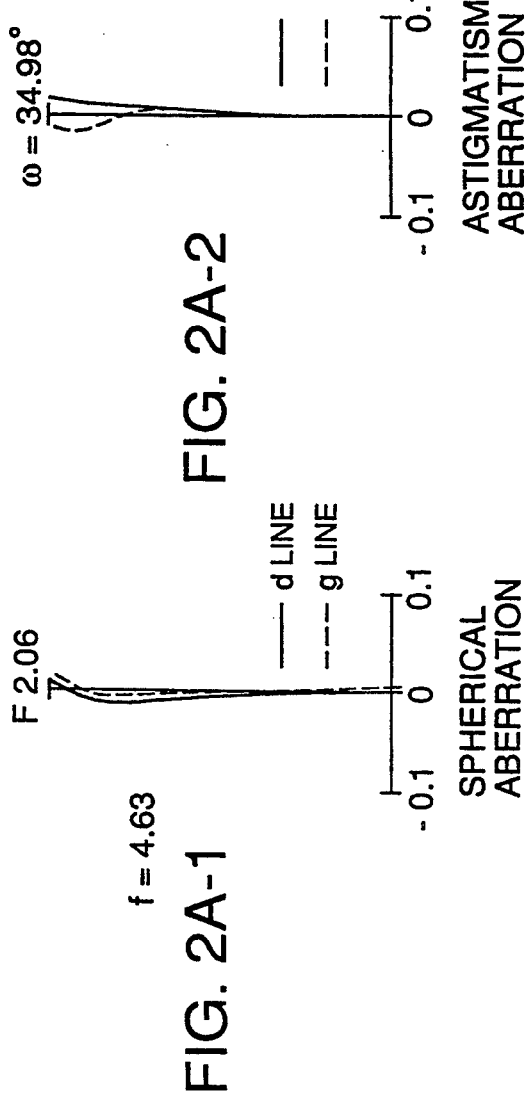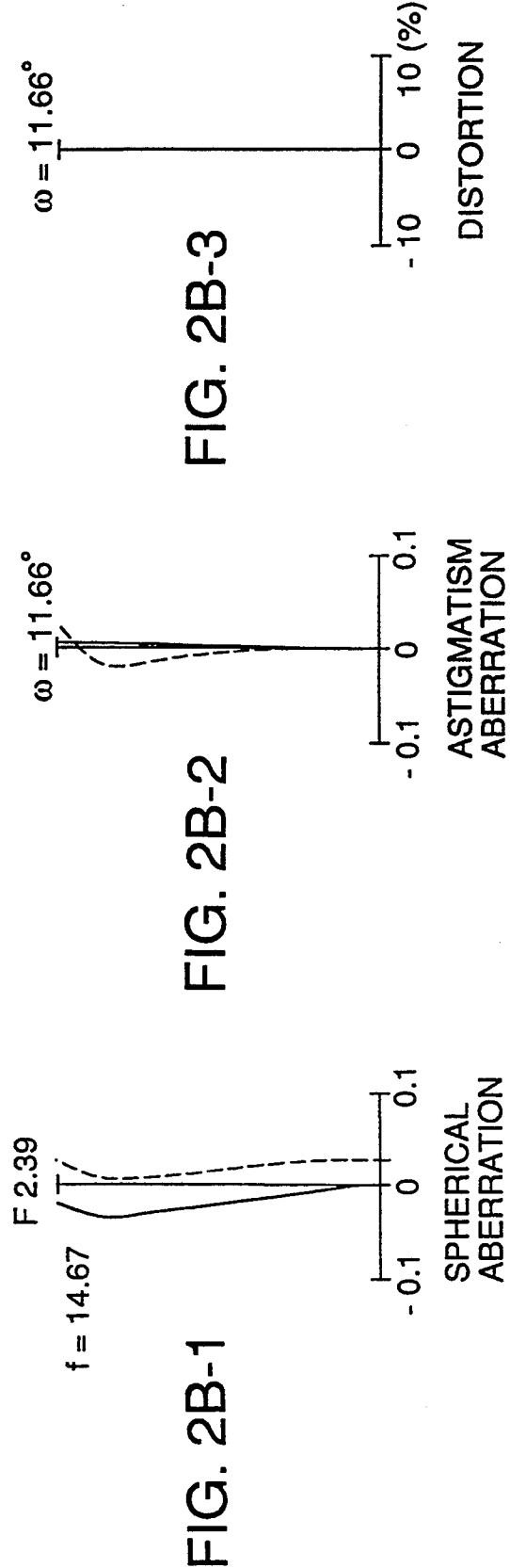

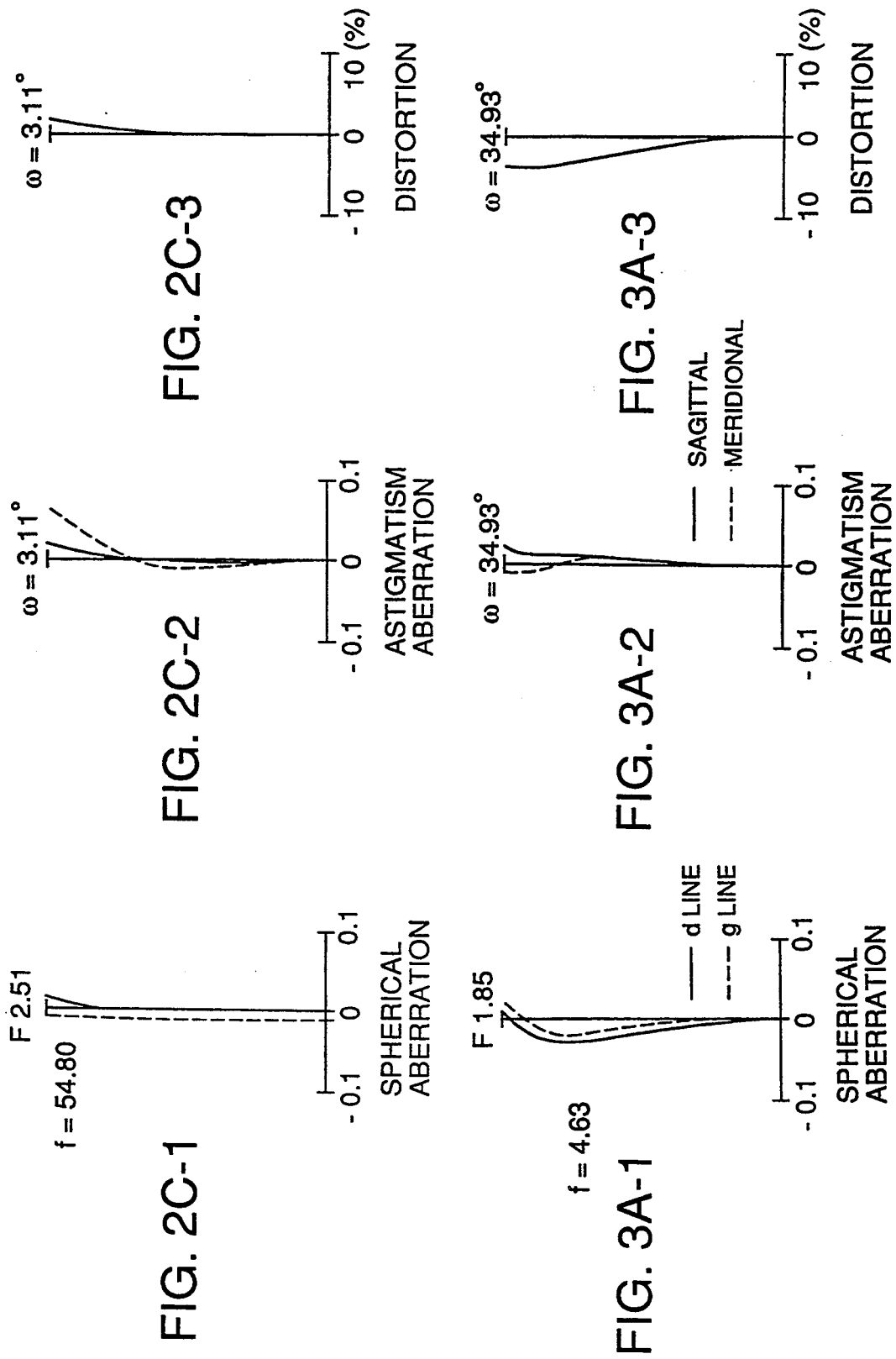

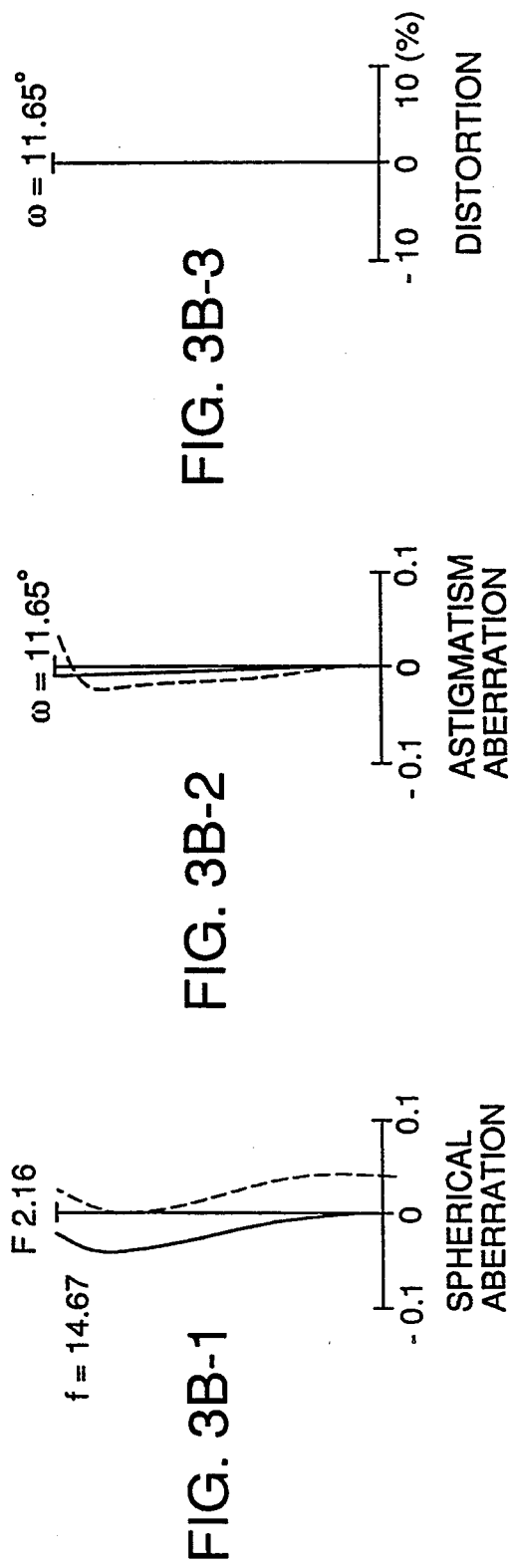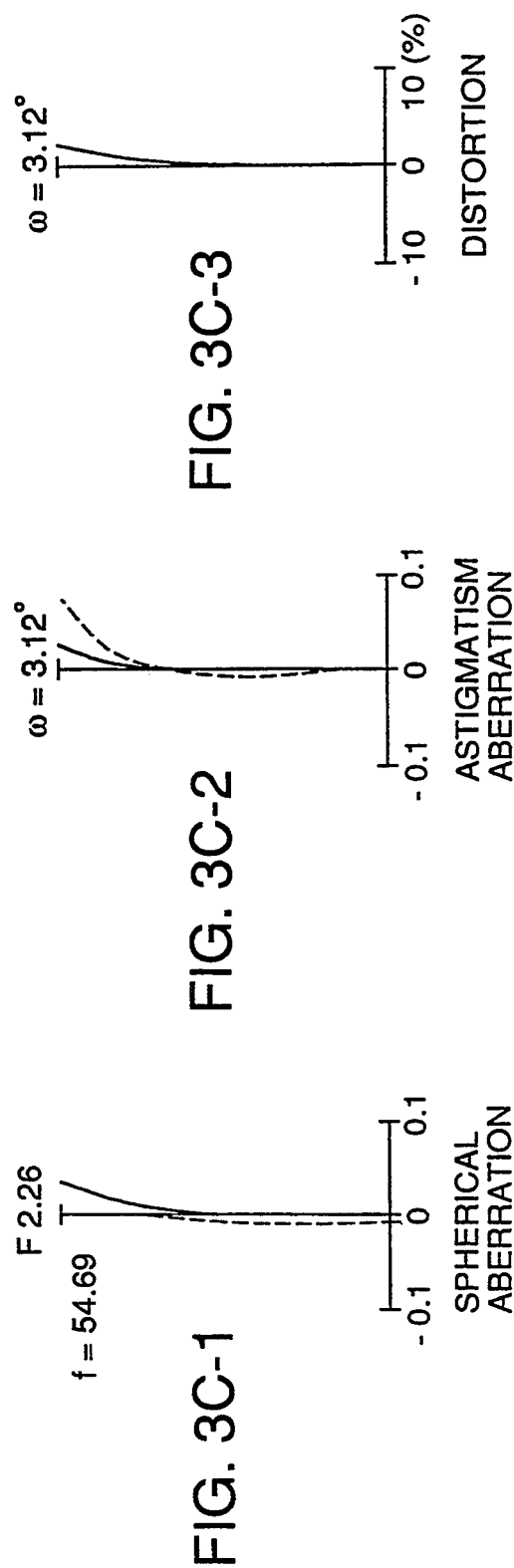

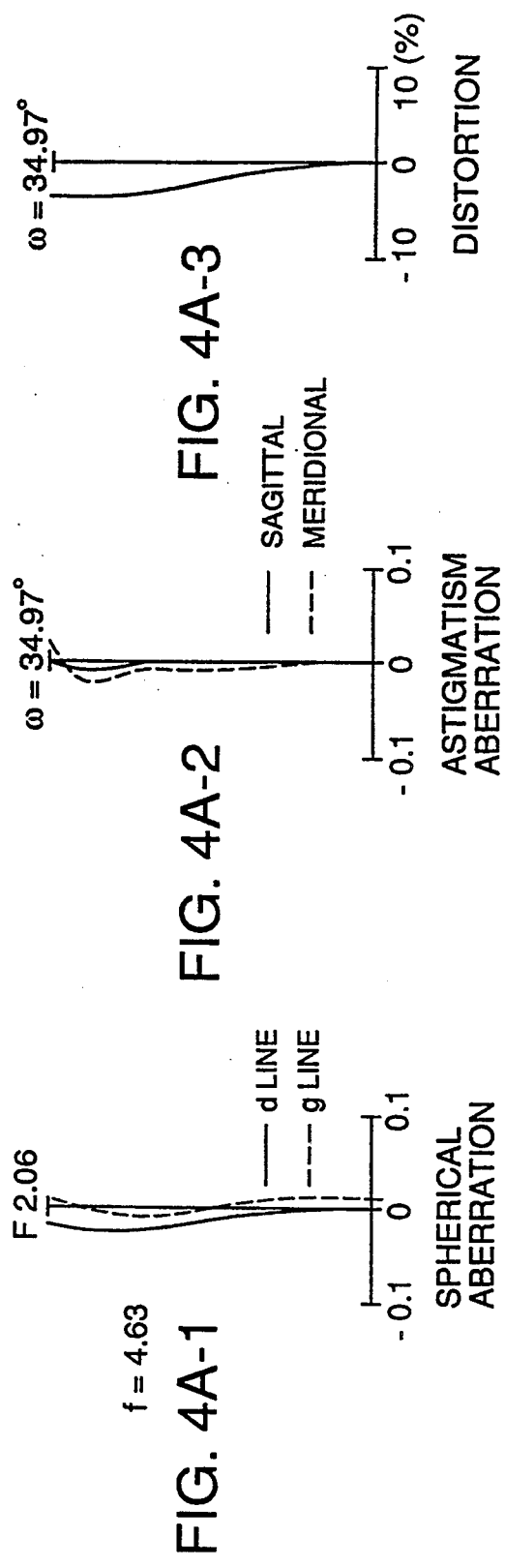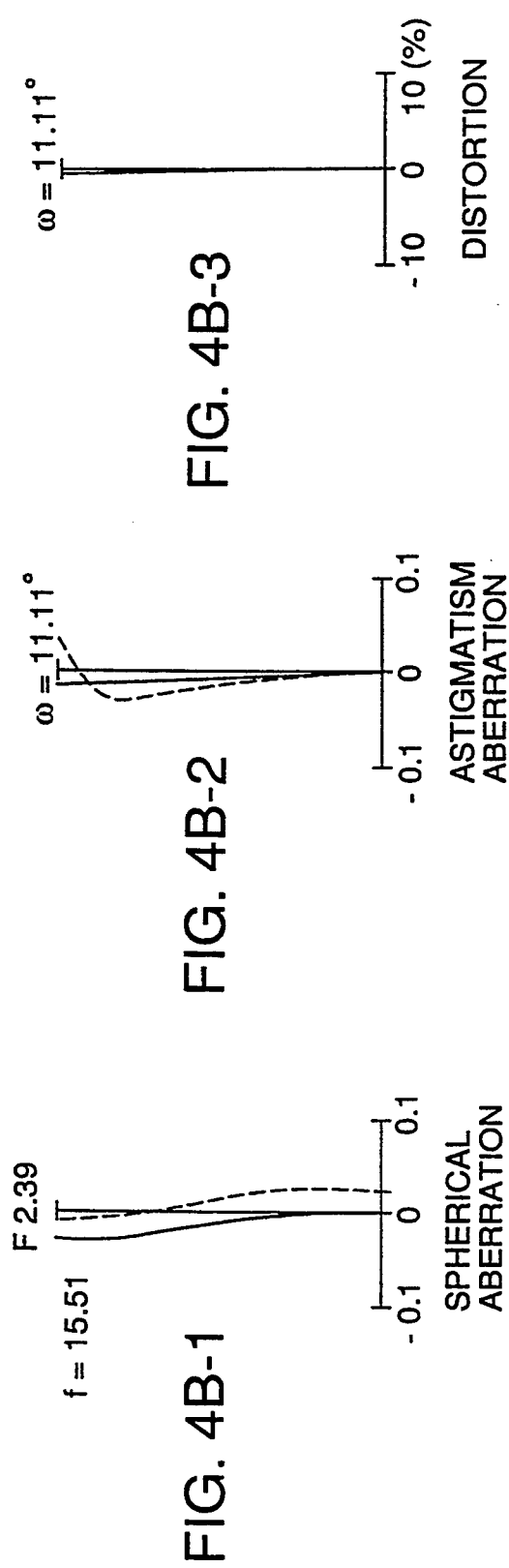

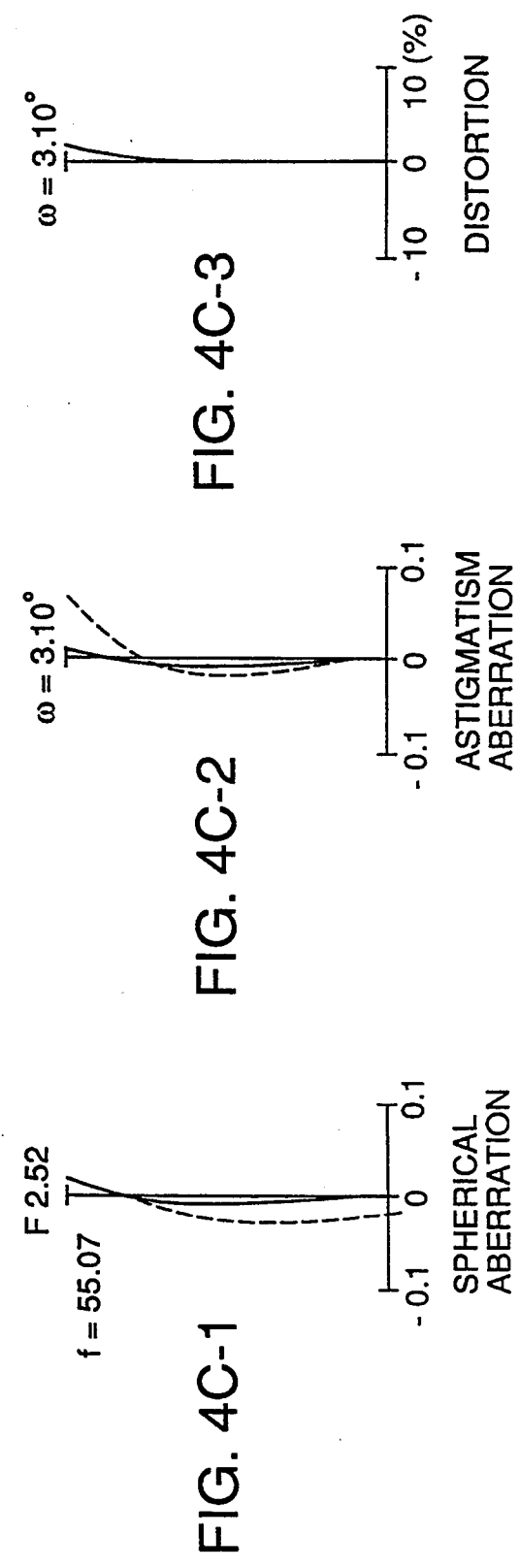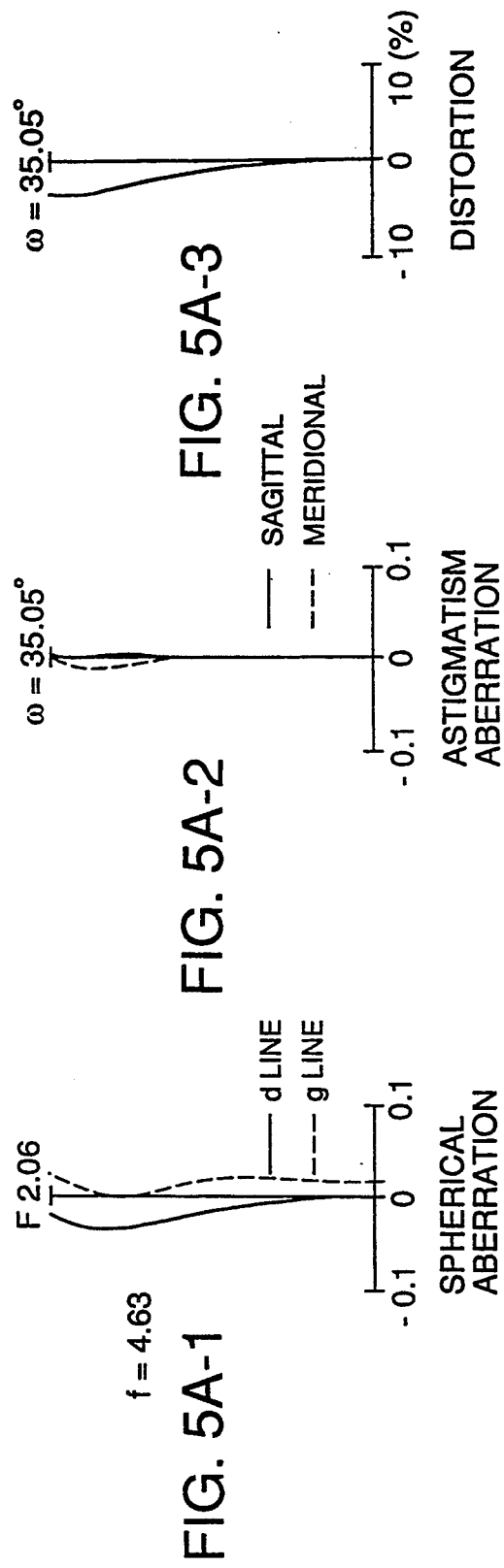

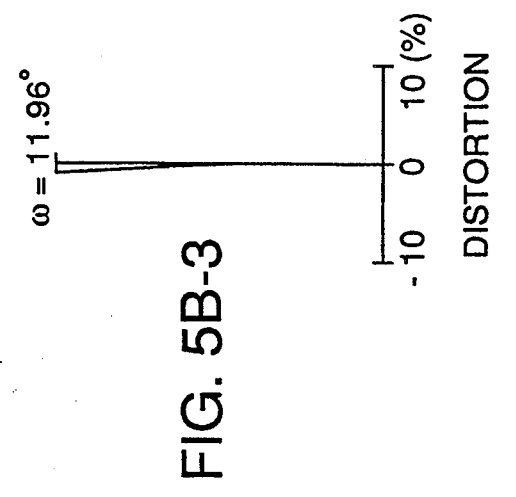
FIG. 5B-1
FIG. 5B-2
FIG. 5B-3
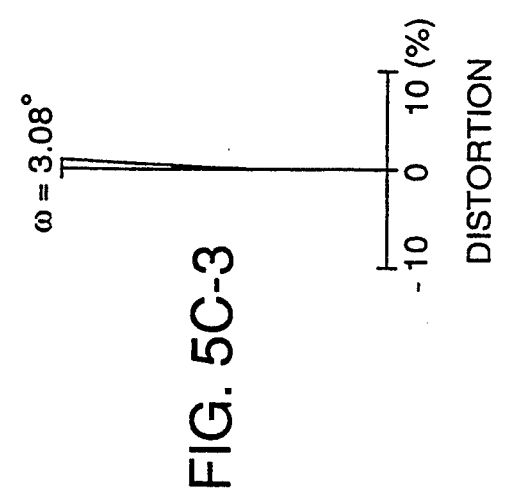
FIG. 5C-1
FIG. 5C-2
FIG. 5C-3

FIG. 6A
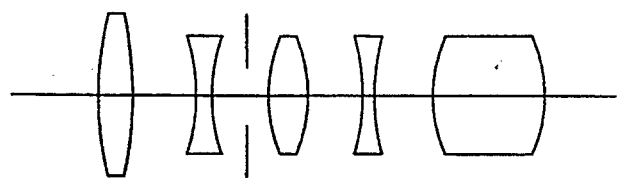
FIG. 6B
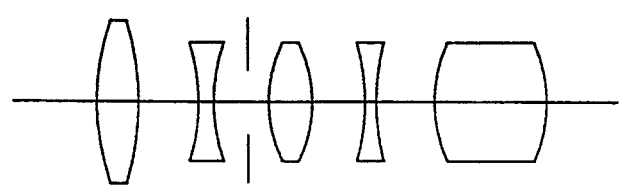
FIG. 6C
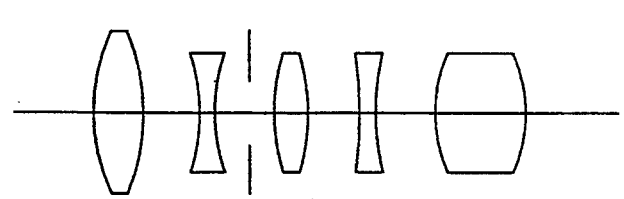
FIG. 6D
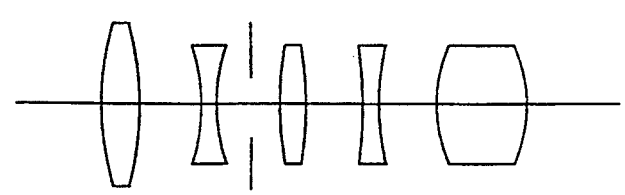

WIDE ANGLE HIGH MAGNIFICATION ZOOM LENS HAVING FIXED GROUP WITH POSITIVE REFRACTIVE POWER

BACKGROUND OF THE INVENTION

The present invention relates to a zoom lens, and more particularly relates to a zoom lens suitable for a compact video camera, wherein the angle of view of the zoom lens is not less than 60° at the wide angle end and the magnification ratio is about 12.

In the case of a zoom lens for a compact video camera in which a solid image sensor is used, it has been desired to extend the wide angle range and also to increase the magnification ratio. In general, when the magnification ratio of this type of lens is increased, it is more difficult to extend the angle of view on the wide angle side than to extend the focal length on the telescopic side. The reason is that: as the angle of a lens is extended, the negative distortion on the wide angle side and astigmatism aberration of high order are increased, so that it becomes difficult to correct the aberration. When the lens angle is extended, the diameter of front lens is increased. Therefore, the weight and dimensions are increased, which does not meet the demand of the market. Accordingly, when a lens is designed, it is important to maintain the performance of the lens while expanding wide angle region and increasing magnification ratio and also it is important to make the lens compact.

In order to obtain a higher magnification zoom lens, a zoom lens including 5 groups having "positive", "negative", "positive", "negative" and "positive" refractive power is well known. This type of zoom lens is effective for correcting the distortion because the the lens is symmetrically structured. Therefore, the aforementioned lens structure is suitable to correct the distortion. The lens structure is disclosed in Japanese Patent Application Open to Public Inspection Nos. 2014/1982 and 39613/1985 in which all lens groups are moved for magnification change. The aforementioned lens structure is characterized in that: when the first lens group is moved to the object side, the magnification effect of the first and second lens groups can be improved; and when a space between the fourth and the fifth lens groups is varied, the image position is corrected in the process of zooming operation, so that the moving range of each lens group is small and a compact wide angle lens can be provided. However, in the aforementioned lens structure, the heaviest lens group is moved. Therefore, it is necessary to increase motor power in the power zooming system in which lens groups are driven by the motor. Further, a large-scale lens frame must be provided with a double structure composed of fixed and moving barrels. Accordingly, the aforementioned lens structure is disadvantageous in that: the dimensions of the mechanism are increased, so that the cost is raised. Furthermore, the aforementioned lens structure is disadvantageous in that: when the lens is protruded, the total lens length is increased, which causes a problem in lens design.

Further, Japanese Patent Publication No. 12125/1982 and Japanese Patent Application Open to Public Inspection No. 158813/1991 disclose a lens structure in which the first lens group is fixed. The aforementioned lens system includes: a first positive lens group that is fixed in the process of variable magnification; a second negative lens group that is moved on the optical axis in the process of magnification change; a third positive lens group; a fourth negative lens group that is fixed in the process of magnification change; and the fifth negative lens group that is also fixed in the process of magnification change. However, in the example shown in Japanese Patent Publication No. 12125/1982, the magnification ratio is 6, which is insufficient, and in the example shown in Japanese Patent Application Open to Public Inspection No. 158813/1991, the third lens group that is moved in the process of zooming, is provided with a diaphragm, so that the mechanism is complicated, which is disadvantageous.

When the first lens group is moved in a focusing operation, the front lens diameter is increased, so that the cost is raised, which is undesirable.

SUMMARY OF THE INVENTION

It is an object of the present invention to provide a simple and compact zoom lens, the angle of view of which is not less than 60° at the wide angle end, and the variable magnification ratio of which is 12.

The fundamental structure of the zoom lens of the present invention is as follows:

From the object side, the following lens groups are successively disposed in order: a first lens group with positive refractive power that is fixed in the process of magnification change; a second lens group with negative refractive power that is moved on the optical axis in the process of magnification change; a third lens group with positive refractive power; a fourth lens group with negative refractive power; and a fifth lens group that is moved on the optical axis in order to compensate the image focal point in the process of magnification change, wherein at least one of the third and fourth lens groups is moved in the process of zooming.

It is preferable that the lens groups are moved for magnification change in the following manner: the second lens group is moved so that a space between the second and the third lens groups can be reduced from the wide angle end to the telescopic end; and a space between the third and the fourth lens groups can be extended from the wide angle end to the telescopic end. In the aforementioned structure, the fifth lens group is moved nonlinearly so that the space between the fifth lens group and the image surface can be widest in the middle portion between the intermediate focal length and the telescopic end.

In the aforementioned zoom lens structure, a focusing operation is carried out when at least one of the third, fourth and fifth lens groups is moved.

That is, the focusing operation is carried out in such a manner that: the third lens group is moved towards the object side; the fourth lens group is moved towards the image side; or the fifth lens group is moved towards the object side.

In the zoom lens structure of the present invention, the first lens group includes at least one negative meniscus lens and at least one two-sided convex lens, wherein they are disposed from the object side in order; the second lens group includes a negative meniscus lens, a two-sided concave lens, and a positive lens; the third lens group includes at least one positive lens; the fourth lens group includes at least one negative lens; and the fifth lens group includes at least one positive lens and at least one negative lens.

More specifically, the zoom lens structure of the present invention is as follows. The first lens group includes: a compound lens in which a negative meniscus lens, the convex surface of which is directed to the object side, and a two-sided convex lens are adhered to each other; and a positive meniscus lens, the convex surface of which is directed to the object side, wherein the negative meniscus lens, the two-sided convex lens and the positive meniscus lens are successively disposed from the object-side in order. The second lens group includes: a negative meniscus lens, the convex surface of which is directed to the object side; and a compound lens in which a two-sided concave lens and a positive lens are adhered to each other, wherein the negative meniscus lens, the two-sided concave lens and the positive lens are successively disposed from the object side in order. The third lens group includes two positive lenses. The fourth lens group includes one negative lens. The fifth lens group includes: a positive lens; and a compound lens in which a negative lens and a positive lens are adhered to each other, wherein the positive lens, the negative lens and the positive lens are successively disposed from the object side in order.

In the aforementioned zoom lens, it is preferable that the following inequalities are satisfied:

$$|F_W/F_{W1.4}| < 0.10 \quad (1)$$

$$1.10 < |F_2/F_W| < 1.50 \quad (2)$$

where the focal length of the entire lens system is $F_W$ at the wide angle end, the focal length of the first to the fourth lens groups is $F_{W1.4}$ at the wide angle end, and the focal length of the second lens group is $F_2$.

In order to design a high magnification zoom lens of simple structure, the following are very effective conditions: a magnification change operation is carried out when the second and the third lens groups, or the fourth lens group is moved; and discrepancy of an image focal surface is compensated when the fifth lens group is moved. That is, compared with a zoom lens in which magnification change and image surface compensation operations are carried out while the fourth and fifth lens groups are fixed, the zoom lens system of the invention compensates the discrepancy of the image surface position by moving the fifth lens group. Therefore, the magnification change operation can be shared by the second, third and fourth lens groups, and further the movement amount of the lens groups can be reduced in a range from the intermediate focal length to the telescopic end. As a result, it is possible to reduce the total length of the zoom lens and the diameter of the front lens. Furthermore, when the third lens group and the fourth lens group are separately moved, that is, when all lens groups except for the first lens group are moved so as to conduct the magnification change and image focal surface compensation operations, the effect of magnification change can be further enhanced by the movement of each lens group. Therefore, the lens system can be further made compact.

Image surface correction is conducted by the fifth lens group in the magnification change process. Therefore, a loci of not less than two lens groups moved in the process of zooming can be made linear, so that the mechanism can be simplified.

The reason why at least one negative lens is included in the first lens group with positive refractive power, why at least one positive lens is included in the second lens group with negative refractive power, and why at least one negative lens is included in the fifth lens group with positive refractive power, is that chromatic aberration and chromatic aberration in the entire magnification range on the optical axis can be sufficiently corrected. The concave lens in the fourth lens group is effective to cancel the negative distortion caused in the second lens group.

Condition (1) concerns the composite focal length of the first to the fourth lens groups. In the case where a focusing operation is conducted by the fifth lens group, the light flux incident upon the fifth lens group can be made approximately afocal as far as condition (1) is satisfied. Therefore, the spherical aberration caused by a focusing operation can be reduced.

Condition (2) concerns the appropriate value of the focal length of the second lens group. When the focal length is increased exceeding the upper limit, the moving amount necessary for magnification change is increased, and the diameter of the front lens is increased. When the focal length is decreased exceeding the lower limit, the Petzval's sum of the entire lens system is reduced, so that it becomes difficult to obtain a flat image surface.

BRIEF DESCRIPTION OF THE DRAWINGS

FIGS. 2A-1 to 2C-3 are aberration diagrams of example 1 at the wide angle end, intermediate focal length and telescopic end;

FIGS. 3A-1 to 3C-3 are aberration curves of example 2 at the wide angle end, intermediate focal length and telescopic end;

FIGS. 4A-1 to 4C-3 are aberration curves of example 3 at the wide angle end, intermediate focal length and telescopic end;

FIGS. 5A-1 to 5C-3 are aberration curves of example 4 at the wide angle end, intermediate focal length and telescopic end; and FIGS. 6A to 6D are locus diagrams of the lenses of the aforementioned examples 1 to 4.

DETAILED DESCRIPTION OF THE PREFERRED EMBODIMENTS

Figure 1:
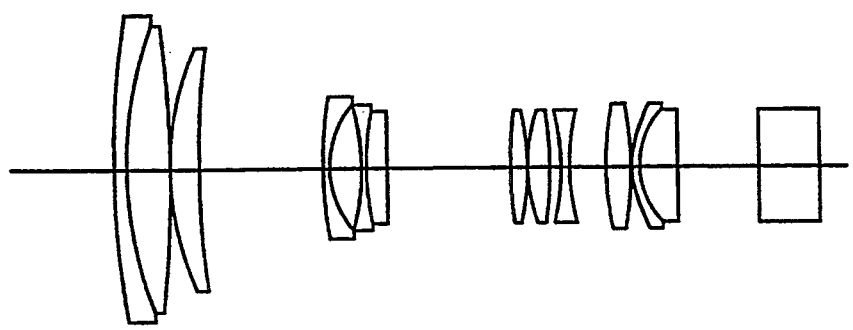
FIG. 1 is a sectional view of the zoom lens of examples 1 to 4 of the present invention.

A sectional view of Example 1 to Example 4 of the present invention is shown in FIG. 1. The loci of the lens groups are shown in FIGS. 6A to FIG. 6D. In these examples, the lenses are disposed in the order of positive-negative-positive-negative-positive from the object side, and the diaphragm is located between the second and the third lens groups. It is preferable that the diaphragm is disposed close to the center of the entire lens system, and under certain circumstances the diaphragm may be disposed between the third and fourth lens groups.

In Examples 1 and 2, the second negative lens group and the third positive lens group are moved so as to carry out the operation of magnification change, and the fifth positive lens group is moved so as to correct the image position when the operation of magnification change is carried out. In these examples, the second lens group is linearly moved from the object side to the image side in a range from the wide angle end to the telescopic end. At the same time, the third lens group is linearly moved from the image side to the object side, which is reverse to the direction of the movement of the second lens group. In the present invention, the loci of the second and the third lens groups are linear, however, no problems are caused even when the loci are nonlinear. The fourth lens group makes the light flux afocal that is sent from the variable magnification lens group.

In Example 3, the magnification change operation is carried out when the second and the fourth lens groups are moved, and the image surface correction is carried out by the fifth lens group in the magnification change operation. In this structure, the concave lens group is moved to the image side in a range from the wide angle end to the telescopic end, and the moving amount for compensation of the image position can be reduced at the telescopic end of the fifth lens group. As a result of the foregoing, the length of the entire lens system can be reduced compared with Examples 1 and 2. Also in this example, the second lens group is linearly moved on the optical axis in the zooming operation. In this example, the moving path may be linear or nonlinear in the zooming operation.

In Example 4, the operation of magnification change is carried out by the second, third and fourth lens groups, and the compensation of image position is carried out by the fifth lens group in the zooming operation. Therefore, the lens barrel structure becomes complicated, however, the length of the entire lens system can be reduced compared with Examples 1 to 3.

In Example 1, the focusing operation is carried out by the fifth lens group, and in Example 2, the focusing operation is carried out by the third and fifth lens groups. In Example 3, the focusing operation is carried out by the fifth lens group, and in Example 4, the focusing operation is carried out by the fourth and the fifth lens groups. In FIGS. 6A to 6D showing the locus of each lens group, a solid line shows a case in which the object is located in an infinite position, and a dot-line shows a case in which the object is located in a position where the object distance is 1 m.

When the aperture ratio is increased in the lens system of the present invention, spherical aberration remains in a position between the wide angle end and the intermediate focal length. In order to perfectly correct the aberration, it is preferable that: the second lens group is composed of three groups of three lens pieces; the third lens group is provided with an aspherical surface; or the fourth lens group is provided with an aspherical surface.

The values of conditions (1) and (2) are as follows in each example.

|  | Example 1 | Example 2 | Example 3 | Example 4 |
| --- | --- | --- | --- | --- |
| Condition (1) | 0.04 | 0.00 | 0.09 | 0.00 |
| Condition (2) | 1.33 | 1.33 | 1.32 | 1.33 |

In the following tables, R is a radius of curvature of each lens surface, D is a central lens thickness or a lens interval, N is a refractive index of glass, V is an Abbe's number, f is a focal length of the entire lens system, $2\omega$ is an angle of view, Fno is an F-number, Y is a maximum image height, and A, B, C, D and E represent the moving distance of each lens group at the wide angle end, intermediate focal length and telescopic end, wherein the object distance is 1 m in a focusing operation. In these examples, a glass block corresponding to BK7 is disposed behind the fifth lens group, and this glass block was assumed to be a filter when the lens system was designed.

Example 1

-continued f = 4.63–54.80    Fno = 1.85–2.26
$2\omega$ = 69.69°–6.22°    Y = 3.03

| Surface No. |  | R | D | N | v |
| --- | --- | --- | --- | --- | --- |
| 1 | First lens group | 57.648 | 0.80 | 1.80518 | 25.4 |
| 2 |  | 24.840 | 6.50 | 1.58913 | 61.2 |
| 3 |  | −231.324 | 0.20 |  |  |
| 4 |  | 22.105 | 4.10 | 1.69680 | 55.5 |
| 5 |  | 67.519 | A |  |  |
| 6 | Second lens group | 101.528 | 0.65 | 1.77250 | 49.6 |
| 7 |  | 6.841 | 3.70 |  |  |
| 8 |  | −19.081 | 0.60 | 1.77250 | 49.6 |
| 9 |  | 9.412 | 2.20 | 1.84666 | 23.8 |
| 10 |  | 109.511 | B |  |  |
| 11 | Third lens group | 52.690 | 1.85 | 1.62299 | 58.2 |
| 12 |  | −24.624 | 0.20 |  |  |
| 13 |  | 11.143 | 2.50 | 1.48749 | 70.2 |
| 14 |  | −30.873 | C |  |  |
| 15 | Fourth lens group | −17.716 | 0.65 | 1.69680 | 55.5 |
| 16 |  | 16.634 | D |  |  |
| 17 | Fifth lens group | 32.119 | 2.30 | 1.69680 | 55.5 |
| 18 |  | −25.533 | 0.20 |  |  |
| 19 |  | 13.681 | 0.60 | 1.84666 | 23.8 |
| 20 |  | 6.580 | 3.30 | 1.58913 | 61.2 |
| 21 |  | 156.199 | E |  |  |
| 22 | Cover glass | ∞ | 4.90 | 1.51633 | 64.1 |
| 23 |  | ∞ |  |  |  |

Interval between groups at each focal length

| f | A | B | C | D | E |
| --- | --- | --- | --- | --- | --- |
| 4.63 | 0.60 | 24.40 | 1.00 | 6.21 | 6.12 |
| 14.67 | 11.79 | 12.71 | 1.50 | 3.40 | 8.93 |
| 54.80 | 49.36 | 3.00 | 3.64 | 5.94 | 6.40 |

| Refractive power | Interval between groups when the focal length is 1 m |  |  |
| --- | --- | --- | --- |
| 1  f(1–5) = 34.092 |  | D | E |
| 2  f(6–10) = −6.162 | Wide angle end | 6.19 | 6.14 |
| 3  f(11–14) = 10.756 | Intermediate | 3.38 | 8.95 |
| 4  f(15–16) = −12.217 | Telescopic end | 3.12 | 9.21 |
| 5  f(17–21) = 14.603 |  |  |  |

Example 2 f = 4.63–54.69    Fno = 1.85–2.26
$2\omega$ = 69.87°–6.23°    Y = 3.03

| Surface No. |  | R | D | N | v |
| --- | --- | --- | --- | --- | --- |
| 1 | First lens group | 62.262 | 0.80 | 1.80518 | 25.4 |
| 2 |  | 25.584 | 6.80 | 1.58913 | 61.2 |
| 3 |  | −161.533 | 0.20 |  |  |
| 4 |  | 21.787 | 4.10 | 1.69680 | 55.5 |
| 5 |  | 62.315 | A |  |  |
| 6 | Second lens group | 111.811 | 0.65 | 1.77250 | 49.6 |
| 7 |  | 6.837 | 3.70 |  |  |
| 8 |  | −18.265 | 0.60 | 1.77250 | 49.6 |
| 9 |  | 9.544 | 2.20 | 1.84666 | 23.8 |
| 10 |  | 158.255 | B |  |  |
| 11 | Third lens group | 50.836 | 1.85 | 1.62299 | 58.2 |
| 12 |  | −26.190 | 0.20 |  |  |
| 13 |  | 11.557 | 2.80 | 1.48749 | 70.2 |
| 14 |  | −29.187 | C |  |  |
| 15 | Fourth lens group | −17.629 | 0.65 | 1.69680 | 55.5 |
| 16 |  | 17.521 | D |  |  |
| 17 | Fifth lens group | 30.740 | 2.30 | 1.69680 | 55.5 |
| 18 |  | −26.225 | 0.20 |  |  |
| 19 |  | 13.237 | 0.60 | 1.84666 | 23.8 |
| 20 |  | 6.467 | 3.90 | 1.58913 | 61.2 |
| 21 |  | 99.517 | E |  |  |
| 22 | Cover glass | ∞ | 4.90 | 1.51633 | 64.1 |
| 23 |  | ∞ |  |  |  |

Interval between groups at each focal length

| f | A | B | C | D | E |
| --- | --- | --- | --- | --- | --- |
| 4.63 | 0.60 | 24.40 | 1.00 | 6.28 | 5.62 |
| 14.67 | 11.81 | 12.73 | 1.45 | 3.40 | 8.50 |
| 54.69 | 19.36 | 3.00 | 3.64 | 5.86 | 6.05 |

Refractive power    Interval between groups when the focal length is 1 m

-continued

| 1 | $f(1-5) = 34.019$ | | C | D | E |
|---|---|---|---|---|---|
| 2 | $f(6-10) = -6.172$ | Wide angle end | 1.00 | 6.25 | 5.65 |
| 3 | $f(11-14) = 10.998$ | Intermediate | 1.60 | 3.30 | 8.60 |
| 4 | $f(15-16) = -12.516$ | Telescopic end | 4.00 | 3.16 | 8.74 |
| 5 | $f(17-21) = 14.577$ | | | | |

Example 3

$f = 4.63-55.07$  $Fno = 2.06-2.50$
$2\omega = 69.94°-6.20°$  $Y = 3.03$

| Surface No. | | R | D | N | $\nu$ |
|---|---|---|---|---|---|
| 1 | | 59.966 | 0.80 | 1.80518 | 25.4 |
| 2 | First lens | 25.375 | 6.50 | 1.58913 | 61.2 |
| 3 | group | −175.877 | 0.20 | | |
| 4 | | 21.464 | 4.10 | 1.69680 | 55.5 |
| 5 | | 58.764 | A | | |
| 6 | | 114.725 | 0.65 | 1.77250 | 49.6 |
| 7 | Second lens | 7.207 | 3.70 | | |
| 8 | group | −19.620 | 0.60 | 1.77250 | 49.6 |
| 9 | | 9.559 | 2.20 | 1.84666 | 23.8 |
| 10 | | 65.699 | B | | |
| 11 | | 61.422 | 1.85 | 1.62299 | 58.2 |
| 12 | Third lens | −23.312 | 0.20 | | |
| 13 | group | 11.699 | 2.50 | 1.48749 | 70.2 |
| 14 | | −54.075 | C | | |
| 15 | Fourth lens | −17.891 | 0.65 | 1.69680 | 55.5 |
| 16 | group | 19.373 | D | | |
| 17 | | 27.449 | 2.30 | 1.69680 | 55.5 |
| 18 | Fifth lens | −25.503 | 0.20 | | |
| 19 | group | 12.698 | 0.60 | 1.84666 | 23.8 |
| 20 | | 6.275 | 3.30 | 1.58913 | 61.2 |
| 21 | | 359.960 | E | | |
| 22 | Cover glass | ∞ | 4.90 | 1.51633 | 64.1 |
| 23 | | ∞ | | | |

| Interval between groups at each focal length | | | | | |
|---|---|---|---|---|---|
| f | A | B | C | D | E |
| 4.63 | 0.60 | 21.76 | 1.40 | 7.22 | 5.77 |
| 15.51 | 11.79 | 10.57 | 2.59 | 3.45 | 8.34 |
| 55.07 | 19.36 | 3.00 | 5.50 | 4.31 | 4.57 |

| | Refractive power | Interval between groups when the focal length is 1 m | | |
|---|---|---|---|---|
| 1 | $f(1-5) = 34.018$ | | D | E |
| 2 | $f(6-10) = -6.115$ | Wide angle end | 7.20 | 5.78 |
| 3 | $f(11-14) = 11.749$ | Intermediate | 1.85 | 8.71 |
| 4 | $f(15-16) = -13.253$ | Telescopic end | 1.50 | 7.38 |
| 5 | $f(17-21) = 13.062$ | | | |

Example 4

$f = 4.63-55.71$  $Fno = 2.06-2.50$
$2\omega = 70.10°-6.16°$  $Y = 3.03$

| Surface No. | | R | D | N | $\nu$ |
|---|---|---|---|---|---|
| 1 | | 57.077 | 0.80 | 1.80518 | 25.4 |
| 2 | First lens | 24.623 | 6.50 | 1.58913 | 61.2 |
| 3 | group | −314.334 | 0.20 | | |
| 4 | | 21.851 | 4.10 | 1.69680 | 55.5 |
| 5 | | 64.257 | A | | |
| 6 | | 94.656 | 0.65 | 1.77250 | 49.6 |
| 7 | Second lens | 7.065 | 3.70 | | |
| 8 | group | −23.446 | 0.60 | 1.77250 | 49.6 |
| 9 | | 9.270 | 2.20 | 1.84666 | 23.8 |
| 10 | | 49.139 | B | | |
| 11 | | 45.554 | 1.85 | 1.62299 | 58.2 |
| 12 | Third lens | −23.790 | 0.20 | | |
| 13 | group | 12.449 | 2.50 | 1.48749 | 70.2 |
| 14 | | −39.209 | C | | |
| 15 | Fourth lens | −18.720 | 0.65 | 1.69680 | 55.5 |
| 16 | group | 20.410 | D | | |
| 17 | | 29.244 | 2.30 | 1.69680 | 55.5 |
| 18 | Fifth lens | −26.376 | 0.20 | | |
| 19 | group | 13.796 | 0.60 | 1.84666 | 23.8 |
| 20 | | 6.355 | 3.30 | 1.58913 | 61.2 |
| 21 | | 111.739 | E | | |
| 22 | Cover glass | ∞ | 4.90 | 1.51633 | 64.1 |
| 23 | | ∞ | | | |

| Interval between groups at each focal length | | | | | |
|---|---|---|---|---|---|
| f | A | B | C | D | E |
| 4.63 | 0.60 | 24.40 | 1.00 | 6.36 | 5.76 |
| 14.43 | 11.79 | 12.72 | 1.87 | 3.42 | 8.33 |
| 55.71 | 19.36 | 3.00 | 6.00 | 4.37 | 5.40 |

| | Refractive power | Interval between groups when the focal length is 1 m | | |
|---|---|---|---|---|
| 1 | $f(1-5) = 34.931$ | | C | D | E |
| 2 | $f(6-10) = -6.178$ | Wide angle end | 1.10 | 6.37 | 5.65 |
| 3 | $f(11-14) = 11.336$ | Intermediate | 2.00 | 3.23 | 8.38 |
| 4 | $f(15-16) = -13.918$ | Telescopic end | 7.50 | 1.70 | 6.56 |
| 5 | $f(17-21) = 14.994$ | | | | |

As shown in the aberration curve of each example, the F-number of the zoom lens of the present invention is 2, which is bright. Although the magnification ratio is 12, which is very high, and the angle of view is 70° at the wide angle end, the distortion and astigmatism aberration can be completely corrected, and further the structure of the zoom lens is compact.

What is claimed is:

1. A zoom lens comprising:
   (a) a first lens group having a positive refractive power and provided nearest to an object to be photographed, said first lens group being disposed at a fixed position;
   (b) a second lens group having a negative refractive power and provided next to said first lens group, said second lens group movable along the optical axis of said zoom lens during a change of magnification;
   (c) a third lens group having a positive refractive power and provided next to said second lens group, said third lens group movable along the optical axis of said zoom lens during a change of magnification;
   (d) a fourth lens group having a negative refractive power and provided next to said third lens group, said fourth lens group movable along the optical axis of said zoom lens during a change of magnification; and
   (e) a fifth lens group provided next to said fourth lens group, said fifth lens group movable along the optical axis of said zoom lens during a change of magnification to compensate for a discrepancy of an image focal point caused by a change in magnification,
   wherein the following inequalities are satisfied:

$|F_w/F_{1.4}| < 0.10$ $1.10 < |F_2/F_w| < 1.50$ where a focal length of the zoom lens is $F_w$ at a wide angle end, a focal length of said first to said fourth lens group is $F_{w1.4}$ at the wide angle end, and a focal length of said second lens group is $F_2$.

2. The zoom lens of claim 1, wherein during an increase of magnification, said second lens group is moved so that the distance between said second lens group and said third lens group is reduced from the wide angle end to the telescopic end, the distance between said third lens group and said fourth lens group is extended from the wide angle end to the telescopic end, and wherein said fifth lens group is moved so that the distance between said fifth lens group and the image focal surface is widest in the middle portion between an intermediate focal length and the telescopic end.

3. The zoom lens of claim 1, wherein said first lens group includes at least one negative meniscus lens and at least one biconvex lens which are disposed from the object side in that order; said second lens group includes a negative meniscus lens, a biconcave lens, and a positive lens; said third lens group includes at least one positive lens; said fourth lens group includes at least one negative lens; and said fifth lens group includes at least one negative lens.

4. The zoom lens of claim 1, wherein said first lens group includes a compound lens in which a negative meniscus lens, the convex surface of which is directed to the object side, and a biconvex lens are adhered to each other, and a positive meniscus lens, the convex surface of which is directed to the object side, said negative meniscus lens, said biconvex lens and said positive meniscus lens being successively disposed from the object side in that order; said second lens group includes a negative meniscus lens, the convex surface of which is directed to the object side, and a compound lens in which a two-sided concave lens and a positive lens are adhered to each other, said negative meniscus lens, said biconvex lens and said positive lens being successively disposed from the object side in that order; said third lens group includes two positive lenses; said fourth lens group includes one negative lens, and said fifth lens group includes a positive lens and a compound lens in which a negative lens and a positive lens are adhered to each other, said positive lens, said negative lens and said positive lens being successively disposed from the object side in that order.

5. The zoom lens of claim 1, wherein focusing is conducted by moving said fifth lens group.

6. The zoom lens of claim 1, wherein focusing is conducted by moving said fifth lens group and one of said third lens group and said fourth lens group.

7. A zoom lens comprising:
a fixed first lens group having a positive refractive power and provided nearest to an object to be photographed;
a second lens group having a negative refractive power and provided next to said first lens group, said second lens group movable along the optical axis of said zoom lens during a change in magnification;
a third lens group having a positive refractive power and provided next to said second lens group, said third lens group movable along the optical axis of said zoom lens during a change in magnification;
a fixed fourth lens group having a negative refractive power and provided next to said third lens group; and
a fifth lens group provided next to said fourth lens group and movable along the optical axis of said zoom lens during a change in magnification to compensate for a discrepancy of an image focal point caused by a change in magnification.

8. A zoom lens comprising:
a fixed first lens group having a positive refractive power and provided nearest to an object to be photographed;
a second lens group having a negative refractive power and provided next to said first lens group, said second lens group movable along the optical axis of said zoom lens during a change in magnification;
a fixed third lens group having a positive refractive power and provided next to said second lens group;
a fourth lens group having a negative refractive power and provided next to said third lens group, said fourth lens group movable along the optical axis of said zoom lens during a change in magnification; and
a fifth lens group provided next to said fourth lens group and movable along the optical axis of said zoom lens during a change in magnification to compensate for a discrepancy of an image focal point caused by a change in magnification.

9. A zoom lens comprising:
(a) a first lens group having a positive refractive power and provided nearest to an object to be photographed, said first lens group being disposed at a fixed position;
(b) a second lens group having a negative refractive power and provided next to said first lens group, said second lens group movable along an optical axis of said zoom lens during a change of magnification;
(c) a third lens group having a positive refractive power and provided next to said second lens group;
(d) a fourth lens group having a negative refractive power and provided next to said third lens group;
(e) a fifth lens group provided next to said fourth lens group, said fifth lens group movable along the optical axis of said zoom lens during a change of magnification to compensate for a discrepancy of an image focal point caused by a change in magnification,
wherein at least one of said third and fourth lens groups are movable along the optical axis of said zoom lens during a change of magnification; and
(f) a diaphragm disposed between said second and third lens groups.

* * * * *